Patented Feb. 27, 1940

2,191,499

UNITED STATES PATENT OFFICE 2,191,499

PETROLEUM WAX ALKYLATED PHENOL AND A PROCESS OF MAKING IT

Orland M. Reiff, Woodbury, N. J., assignor to Socony-Vacuum Oil Company, Incorporated, New York, N. Y., a corporation of New York No Drawing. Original application November 27, 1935, Serial No. 51,969. Divided and this application March 26, 1937, Serial No. 133,270

20 Claims. (Cl. 260—624)

This invention relates to the production of certain new chemical compositions which may be generally designated as oxyaromatic compounds substituted in their aryl nuclei by long chain alkyl radicals. More particularly, the present invention relates to the production of a class of compounds of this general type that are stable at relatively high temperatures and which in many instances are suitable for use in wax containing hydrocarbon oils as pour point depressants.

According to Patent 1,815,022, granted to Garland H. B. Davis on July 14, 1931, naphthalene may be condensed with chlorinated wax by mixing the naphthalene with an equal weight of aluminum chloride and then slowly adding the chlorinated wax at a temperature of 140° to 160° F. and finally raising the temperature to around 200° F. to expel the hydrochloric acid formed. The aluminum chloride may then be settled out of the final product. The result of such a reaction appears to be the production of an alkylated naphthalene, which is sufficiently stable so that it will not be decomposed by the temperatures ordinarily encountered, when it is used as a pour point depressant in lubricating oils in automobile engines and the like.

In searching for other materials that might be more advantageously used to depress the pour point of wax containing hydrocarbon oils, attempts were made to form wax substituted phenolic compounds by methods similar to those described in the Davis patent, but the results were not encouraging. The compositions formed not only lack the ability to depress the pour point of oil but were found to be quite unstable under ordinary conditions of use, and rapidly decomposed into their component parts.

It has now been discovered that particularly when phenol and chlorinated paraffin wax are used as the starting ingredients, a stable, relatively pure material, which is particularly effective as a pour point depressant can be made by following the principles which are about to be described. Although it is believed that the principles of this invention are applicable not only to the formation of wax substituted phenol, but also to the formation of alkyl substituted oxyaromatic substances in general, the invention will nevertheless be described as it has been applied to the manufacture of paraffin wax substituted phenol, and the possible extension of the invention to the manufacture of other alkylated oxyaromatic materials will be discussed later.

According to this invention it has been discovered that if a reaction between the phenol, chlorinated wax and aluminum chloride is carried out merely by heating the reactants slowly until the initial evolution of hydrochloric acid gas ceases, the aluminum of the aluminum chloride merely replaces the hydrogen on the OH group of the phenol and the chlorine, combining with this hydrogen, forms hydrochloric acid. Thus the product so formed is mostly a mixture of an aluminum phenate type of compound, perhaps containing some chlorine, and unreacted phenol and chlorinated wax.

It has also been found, that if instead of terminating the reaction at the point where the first evolution of hydrochloric acid gas ceases, the temperature be further raised and an additional evolution of hydrochloric acid thus caused to take place, a wax substitution will take place but the aluminum will still remain as a part of the compound. For example, when using around 3% aluminum chloride, if the temperature is raised to about 350° F. to complete the reaction, the product at the end of the reaction and before further treatment contains a considerable amount of wax substituted aluminum phenate.

Further than the step of heating to complete the reaction, which is one important step in this invention, it has also been discovered that the wax substituted aluminum phenate type of compound can be converted into the desired wax substituted phenol and freed from aluminum both as a part of the compound and as intermixed aluminum chloride by hydrolyzing the product and washing out the reformed aluminum chloride, both with water containing butanol or the like.

Even though this outlined procedure is adopted, however, the type of product which is by far the most desirable will not result unless the conditions and proportions are appropriately regulated and the material formed is purified properly.

The conditions which are practically essential to the production and purification of the new product, if the best results are to be obtained, will be readily understood from the following detailed description of the new process. A skilled chemist will, of course, see numerous places where minor variations can be made, but any radical departure from the detailed instructions hereafter set forth is almost certain to result in a failure to produce the preferred type of product according to this invention.

In the first place, the reagents used are phenol, chlorinated wax and anhydrous aluminum chloride. The phenol, $C_6H_5OH$, should be substantially pure and free from water. The aluminum chloride is the usual commercial grade of anhydrous material.

The chlorinated paraffin wax, or chlorwax as it is sometimes called, is prepared from a paraffin wax melting at approximately 120° F. to 130° F. and having a molecular weight of the order of 300. Materials having short alkyl chains or low melting points are not capable of yielding the desired products and hence the use of petrolatum, wax distillate and the like is to be avoided. Although it is conceivable that such a wax might be derived from another source, it will usually be a petroleum wax. With the wax melted and heated to about 200° F., chlorine can be bubbled through until the desired amount, about 14%, is absorbed. Higher temperatures hasten this reaction, but if too high are likely to darken the product.

The degree of chlorination of the chlorwax is of considerable importance. As the chlorine content of the wax increases, the depressant effect of the product increases, but simultaneously, two detrimental characteristics develop. The product tends to become harder and less soluble in oil. This tendency becomes pronounced at about 18% of chlorine, and when chlorwax containing about 22% of chlorine is used, the resulting product is a rubbery mass practically insoluble in oil and very difficult to remove from the reaction vessel. On account of its lack of oil solubility, this product is practically useless for the purpose intended. At the same time, increases in chlorine content cause the wax substituted phenol formed from the chlorwax to be less stable at elevated temperatures. Below 12% of chlorine, the depressant ability of the product falls off to a marked degree. For these reasons it is preferred to use chlorwax containing about 14% of chlorine, or at least between 12% and 14%.

In accomplishing the reaction, phenol and chlorwax may be mixed together at a temperature varying from just above the melting point of the chlorwax to not over 150° F. The preferred proportions are one molecular amount of phenol to a sufficient proportion of chlorwax to contain four atomic proportions of chlorine. The admixed phenol and chlorwax are heated to about 150° F., and anhydrous aluminum chloride introduced. The amount of aluminum chloride used should be about 3% by weight of the chlorwax. While adding this reagent, the mixture should be actively stirred and the rate of addition should be sufficiently slow to avoid violent foaming. During the addition of the aluminum chloride, the temperature should be held at about 150° F. After the addition of the aluminum chloride has been completed, the temperature of the mixture may be raised slowly, over a period of around fifteen to twenty-five minutes, to about 250° F. and then more slowly to around 350° F. At about 200° F. a new evolution of hydrochloric acid begins and this continues as the temperature rises, becoming quite violent at around 275° F. To control the evolution of hydrogen chloride the temperature is preferably raised from 250° F. to 350° F. at a rate of approximately 1° F. per minute. The whole operation of heating to 350° F. will occupy approximately two hours from the time of adding the aluminum chloride, and the reaction mixture should have substantially ceased to emit hydrochloric acid gas when the final temperature is reached. If it has not done so, it may be held at 350° F. for a short time to allow completion of the reaction, but it should not be heated appreciably above 350° F., nor should it be held for any extended length of time at that temperature.

The ratio of one molecular proportion of phenol to sufficient chlorwax to contain four atomic proportions of chlorine is another important factor in producing the desired product. The effectiveness of the depressant products increases as the ratio of chlorwax to phenol increases until a ratio of three atomic proportions of chlorine to one molecular proportion of phenol is reached. The derivative having four atomic proportions of chlorine to one molecular proportion of phenol is slightly less effective but is more stable at elevated temperatures, however, and hence is preferred, particularly for use in internal combustion engines, such as automotive engines.

The percentage of aluminum chloride used is likewise not susceptible to wide variations if the most desirable products are to be obtained. When less than 3% of aluminum chloride is used, (based on chlorwax) it is difficult to complete the reaction. Either prolonged heating at the above mentioned temperatures is necessary to obtain a desirable product or higher temperatures must be employed. The use of higher temperatures to accelerate the reaction results in cracking of the wax ingredient and greatly lessens the desirable characteristics of the product. With higher percentages of aluminum chloride, say of the order of 5%, a reaction may be accomplished at lower temperatures, but cracking also takes place, and so again the desired product does not result. In addition, the use of any greater quantity of aluminum chloride than is necessary is uneconomical and causes difficulty in purifying the final product. The effectiveness of the final material depends much upon the form of molecule of the wax ingredient, and any splitting, cracking, or shortening of this molecule immediately lessens the value of the product. Three per cent of aluminum chloride will secure proper reaction with a minimum of wax-splitting and is, for that reason, preferred.

The use of solvents of a hydrocarbon nature to expedite the above reaction, especially light solvents such as kerosene, or those containing unsaturated hydrocarbons, is to be avoided. A portion of such solvents may be substituted into the product, in place of the desired wax radical, and the presence of such short chain alkyls is highly detrimental. It is preferable to work entirely without solvents.

The manner of carrying out the reaction, especially with respect to temperature and relation of time and temperature, is of the utmost importance. To recapitulate, it is preferred to introduce aluminum chloride at about 150° F., and afterwards heat to a maximum of 350° F. over a period of about two hours, raising the temperature not more than a degree per minute between 250° F. and 350° F. Below about 150° F. only a mild reaction will result from the addition of 3% aluminum chloride to the phenol and chlorwax mixture. At 150° F. a more violent reaction occurs, but the evolution of hydrochloric acid soon ceases. If the resulting product is chemically examined it will be found that little or no alkyl substitution of the phenol has taken place. Instead a phenate type of compound seems to have been formed.

Upon raising the temperature, evolution of hydrochloric acid is resumed at about 200° F. and alkyl substitution appears to begin. Raising the temperature at the rate of one degree per minute brings about continuous evolution of hydrogen chloride and when the proportions are such that there are about four atomic weights of chlorine per molecular weight of phenol, this will cause substantial completion of the reaction by the time 350° F. is reached. Substantially lower rates of heating and/or exposure to temperatures greater than 350° F. tend to bring about conditions wherein the cracking effect of the aluminum chloride on the wax is sufficiently great to impair the effectiveness of the product as a depressant. Addition of aluminum chloride at temperatures higher than about 150° F. also result in decreased effectiveness, probably due to wax-splitting.

The product at this point is a good depressant, but under conditions of use does not remain so and rapidly loses its effect. Apparently the aluminum is still combined in the product making it in part a wax substituted aluminum phenate, for the aluminum cannot be removed by settling or centrifuging, and the product is clear rather than opaque or even cloudy.

To properly purify the product, it must be treated with something that is capable of hydrolyzing out the aluminum, which then combines with chlorine which remains dissolved in the mixture to reform aluminum chloride. When washed with water, the hydrolization apparently takes place, but difficultly separable emulsions are formed, and even when the washing is repeated a great number of times until the washings finally are neutral, the product is still not of the desired purity.

If instead, however, water containing an alcohol, such as butanol, is used and the product washed a half dozen times with equal volumes of water, each containing about 2% butanol, (based on product), the aluminum and chlorine are both removed. The washing should be accomplished with vigorous stirring and at relatively high temperatures, say of the order of 175° F. The first two or three washes, if desired, may be pure water without alcohol. The washing should be continued until the product is sufficiently free from aluminum, etc., to satisfy a requirement of 0.02% maximum ash content. Emulsion troubles in washing, and likewise instability of the final product, increase rapidly with increases in percentage of aluminum chloride used in its preparation.

The properties of the pour depressant product so prepared are substantially as follows:

| | |
|---|---|
| Pour | about 90° F. |
| Conradson carbon | about 1.5% |
| Visc. Saybolt at 130° F | about 1930 seconds |
| Visc. Saybolt at 210° F | about 300 seconds |
| Ash—maximum | about 0.02% |
| Mean molecular weight | about 1000 |

By making the variations in conditions that may become necessary, the present method may be applied to the manufacture of other alkylated oxyaromatic compounds, for example, those having alkyl groups with any desired number of carbon atoms and those having for their aryl nuclei, such compounds as naphthols, anthrols, resorcinol, hydroquinone, chlorphenol, or any other material or mixture of materials that may be classified as oxyaromatic, that is, having oxygen atoms directly linked to the carbon atoms of a benzene ring. Diphenyl ether, naphthyl methyl ether, and benzyl phenol may be cited as still further examples. Insofar as has been determined, satisfactory stable compositions may be made with any combination of these alkyl and oxyaromatic starting materials. Experiments indicate, however, that all of such materials will not function as depressants for the pour point of wax containing oils.

The present application is a division of application Serial Number 51,969, filed November 27, 1935.

I claim:

1. A method of forming stable alkyl-substituted oxyaromatic compounds that comprises the steps of: mixing together a chlorinated alkyl compound having a molecular weight about that of petroleum wax containing from about 12 per cent to about 14 per cent chlorine and an oxyaromatic compound; heating the mixture and adding a few per cent of aluminum chloride at a temperature not in excess of 150° F.; heating, after the addition of the aluminum chloride, to slowly raise the temperature of the mixture to between 200° F. and 350° F. until the evolution of hydrogen chloride has substantially ceased; then discontinuing the heating and washing with water containing an alcohol to remove aluminum and purify the product.

2. A method of forming stable alkyl-substituted oxyaromatic compounds that comprises the steps of: mixing together a chlorinated alkyl compound having a molecular weight about that of petroleum wax containing from about 12 per cent to about 14 per cent chlorine and an oxyaromatic compound; heating the mixture and adding a few per cent of aluminum chloride at a temperature not in excess of 150° F.; heating, after the addition of the aluminum chloride, to slowly raise the temperature of the mixture over a period of about two hours to a temperature of about 350° F. until the evolution of hydrogen chloride has substantially ceased; then discontinuing the heating and washing with water containing an alcohol to remove aluminum and purify the product.

3. A method of forming stable alkyl-substituted oxyaromatic compounds that comprises the steps of: mixing together a chlorinated alkyl compound having a molecular weight about that of petroleum wax containing from about 12 per cent to about 14 per cent chlorine and an oxyaromatic compound in the ratio of about one molecular proportion of oxyaromatic compound to a quantity of the chlorinated alkyl compound containing about four atomic proportions of chlorine; heating the mixture and adding a few per cent of aluminum chloride at a temperature not in excess of 150° F.; heating, after the addition of the aluminum chloride, to slowly raise the temperature of the mixture to between 200° F. and 350° F. until the evolution of hydrogen chloride has substantially ceased; then discontinuing the heating and washing with water containing an alcohol to remove aluminum and purify the product.

4. A method of forming stable alkyl-substituted oxyaromatic compounds that comprises the steps of: mixing together a chlorinated alkyl compound having a molecular weight about that of petroleum wax containing from about 12 per cent to about 14 per cent chlorine and an oxyaromatic compound in the ratio of about one molecular proportion of oxyaromatic compound to a quantity of the chlorinated alkyl compound containing about four atomic proportions of chlorine; heating the mixture and adding a few per cent of aluminum chloride at a temperature not in excess of 150° F.; heating, after the addition of the aluminum chloride, to slowly raise the temperature of the mixture over a period of about two hours to a temperature of about 350° F.; then discontinuing the heating and washing with water containing an alcohol to remove aluminum and purify the product.

5. As a new composition of matter, wax-substituted phenol prepared by mixing chlorinated paraffin wax and phenol, adding anhydrous aluminum chloride thereto at a temperature of about 150° F., heating the mixture to 250° F., raising the temperature from 250° F. to about 350° F. at the rate of approximately one degree per minute, and discontinuing the heating, and then washing the product with water containing an alcohol to purify the same and remove aluminum, the chlorinated wax containing about 14 per cent of chlorine and the proportions of the ingredients being such that about four atoms of chlorine are originally present in the chlorinated wax for each molecule of phenol, and the amount of aluminum chloride used being approximately 3 per cent based on the chlorinated wax.

6. As a new composition of matter, wax substituted phenol prepared by mixing chlorinated paraffin wax and phenol, adding anhydrous aluminum chloride thereto at a temperature of about 150° F., heating the mixture to about 250° F., raising the temperature from 250° F. to about 350° F. at the rate of approximately 1° per minute, discontinuing the heating, washing the reaction product with a solution of water containing an alcohol to purify same to an ash content not substantially in excess of 0.02%, the chlorinated wax containing about 14% of chlorine and the proportions of the ingredients being such that about four atoms of chlorine are originally present in the chlorinated wax for each molecule of phenol, aluminum chloride being used in the proportion of approximately 3%, based on chlorinated wax, said wax-substituted phenol being capable of depressing the pour point of oil-wax mixtures.

7. A method of making wax substituted phenol, comprising the steps of mixing chlorinated paraffin wax and phenol, adding anhydrous aluminum chloride thereto at a temperature of about 150° F., heating the mixture to a temperature of about 250° F. during a period of about 20 minutes, thereafter raising the temperature at the rate of approximately 1° per minute to about 350° F., and discontinuing the heating, washing the product with water containing an alcohol, the chlorinated wax containing about 14% of chlorine and the proportions of the ingredients being such that about four atoms of chlorine are originally present in the chlorinated wax for each molecule of phenol, and the amount of aluminum chloride used being about 3% based on the chlorinated wax.

8. A method of making wax-substituted phenol, comprising the steps of mixing chlorinated paraffin wax and phenol, adding anhydrous aluminum chloride thereto at a temperature of about 150° F., heating the mixture to a temperature of about 250° F. during a period of about 20 minutes, thereafter raising the temperature at the rate of approximately 1° per minute to about 350° F., discontinuing the heating, washing the reaction product with water containing an alcohol to purify same to an ash content not substantially in excess of 0.02%, the chlorinated wax containing about 14% of chlorine and the proportions of the ingredients being such that about four atoms of chlorine are originally present in the chlorinated wax for each molecule of phenol, and the amount of aluminum chloride used being about 3% based on the chlorinated wax.

9. A method for making a wax-substituted phenol, comprising the steps of mixing chlorinated paraffin wax, containing between about twelve per cent and about fourteen per cent chlorine, with a phenol in the ratio of one molecular proportion of phenol to a quantity of chlorinated wax containing about four atomic proportions of chlorine; adding anhydrous aluminum chloride to the mixture at a temperature of about 150° F. in an amount corresponding to from about three per cent to about five per cent by weight of chlorinated wax; slowly heating the mixture to a temperature between 200° F. and 350° F. until evolution of hydrogen chloride has substantially ceased; and then washing the reaction mixture with water containing an alcohol to remove aluminum and purify the product.

10. As a new composition of matter, a wax-substituted phenol prepared by mixing chlorinated paraffin wax, containing between about twelve and about fourteen per cent chlorine, with a phenol in the ratio of one molecular proportion of the phenol to a quantity of chlorinated wax containing about four atomic proportions of chlorine; adding anhydrous aluminum chloride to the mixture at a temperature of about 150° F. in an amount corresponding to from about three per cent to about five percent by weight of the chlorinated wax; slowly heating the mixture to a temperature between 200° F. and 350° F. until evolution of hydrogen chloride has substantially ceased; and then washing with water containing an alcohol to remove aluminum and purify the product.

11. As a new composition of matter, a wax-substituted phenol prepared from chlorinated paraffin wax, unsubstituted phenol and anhydrous aluminum chloride by heating to around 350° F. and thereafter adding water to the mixture to effect removal of the aluminum chloride, the chlorinated wax containing around 14 per cent of chlorine and the proportions of the ingredients being such that around four atoms of chlorine are originally present in the chlorinated wax for each molecule of phenyl and there is also present about 3 per cent of aluminum chloride based on the chlorinated wax.

12. As a new composition of matter, a wax-substituted phenol prepared from chlorinated paraffin wax, unsubstituted phenol and anhydrous aluminum chloride by mixing at around 150° F. and heating to around 350° F. over a period of about two hours and thereafter adding water to the mixture to effect removal of the aluminum chloride, the chlorinated wax containing around 14 per cent of chlorine and the proportions of the ingredients being such that around four atoms of chlorine are originally present in the chlorinated wax for each molecule of phenol and there is also present about 3 per cent of aluminum chloride based on the chlorinated wax.

13. As a new composition of matter, a wax-substituted phenol prepared by mixing chlorinated paraffin wax and unsubstituted phenol, adding anhydrous aluminum chloride thereto at a temperature of around 150° F., heating the mixture to approximately 250° F., then raising the temperature at the rate of approximately one degree F. per minute to 350° F., discontinuing said heating and thereafter adding water to the mixture to effect removal of aluminum chloride, the chlorinated wax containing about 14 per cent of chlorine and the proportions of the ingredients being such that about four atoms of chlorine are originally present in the chlorinated wax for each molecule of phenol, aluminum chloride being used in the proportion of approximately 3 per cent based on the chlorinated wax.

14. As a new composition of matter, a substantially pure poly-wax-substituted phenol otherwise unsubstituted formed by interacting chlorinated paraffin wax and phenol with heating in the presence of aluminum chloride at a temperature reaching about 350° F. sufficiently high to cause alkylation and adding water thereto to effect removal of the aluminum chloride.

15. As a new composition of matter, a substantially pure poly-wax-substituted phenol otherwise unsubstituted formed by interacting chlorinated paraffin wax and phenol with heating in the presence of aluminum chloride at a temperature sufficiently in excess of 200° F. to cause a substantial alkylation and adding water thereto to effect removal of the aluminum chloride, said wax-substituted phenol having an ash content of not more than around 0.02 per cent, the said product being effective when incorporated in minor proportion in a mineral oil of high pour point to substantially depress the pour point thereof.

16. As a new composition of matter, a substantially pure poly-wax-substituted phenol otherwise unsubstituted formed by interacting chlorinated paraffin wax and phenol with heating in the presence of aluminum chloride at a temperature sufficiently in excess of 200° F. to cause substantial alkylation and washing the reaction product with a mixture of alcohol and water to effect removal of the aluminum chloride, said wax-substituted phenol having an ash content of not more than around 0.02 per cent and being effective when incorporated in a mineral oil of high pour point to substantially depress the pour point thereof.

17. As a new composition of matter, a substantially pure poly-wax-substituted phenol otherwise unsubstituted formed by interacting chlorinated paraffin wax and phenol, in proportions such that at least three atomic proportions of chlorine are present in the original materials for each mol of phenol, with heating in the presence of aluminum chloride at a temperature sufficiently in excess of 200° F. to cause substantial alkylation, and adding water thereto to effect removal of aluminum chloride, said wax-substituted phenol having an ash content of not more than around 0.02 per cent and being effective when incorporated in a mineral oil of high pour point to substantially depress the pour point thereof.

18. As a new composition of matter, a substantially pure poly-wax-substituted phenol otherwise unsubstituted formed by interacting chlorinated paraffin wax and phenol, in proportions such that about four atomic proportions of chlorine are present in the original materials for each mol of phenol, with heating in the presence of aluminum chloride at a temperature sufficiently high to cause substantially alkylation, and adding water thereto to effect removal of the aluminum chloride, said wax-substituted phenol having an ash content of not more than around 0.02 per cent and being effective when added in a minor proportion to a mineral oil of high pour point to substantially depress the pour point of such oil.

19. As a new composition of matter, a substantially pure poly-wax-substituted phenol otherwise unsubstituted formed by interacting chlorinated paraffin wax and phenol with heating in the presence of aluminum chloride at a temperature of from about 200° F. to about 350° F. sufficiently high to cause substantial alkylation as indicated by substantial cessation of hydrochloric acid evolution, and adding water thereto to effect removal of aluminum chloride, the chlorinated wax containing from about 12 per cent to about 14 per cent chlorine and the proportions of ingredients being such that about three to four atoms of chlorine are originally present in the chlorinated wax for each molecule of phenol and there is also present from about 3 per cent to about 5 per cent of aluminum chloride based upon the chlorinated wax, said wax-substituted phenol being effective when added in a minor proportion to a mineral oil of high pour point to substantially depress the pour point of said oil.

20. As a new composition of matter, a substantially pure poly-wax-substituted phenol otherwise unsubstituted formed by interacting chlorinated paraffin wax and phenol with heating in the presence of aluminum chloride at a temperature in excess of about 200° F. sufficiently high to cause substantial alkylation and adding water thereto to effect removal of aluminum chloride, the said product being effective when added in a minor proportion to a mineral oil of high pour point to substantially depress the pour point of said oil.

ORLAND M. REIFF.